July 29, 1958     A. ZWIERZYNSKI     2,844,878
COMBINED MICROMETER INSTRUMENT
Filed Feb. 15, 1956
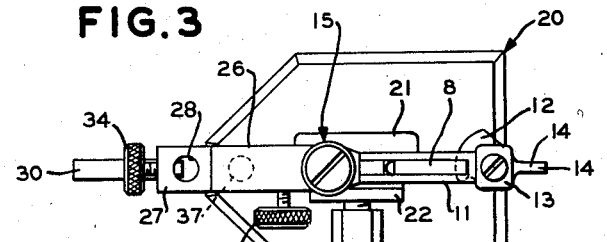
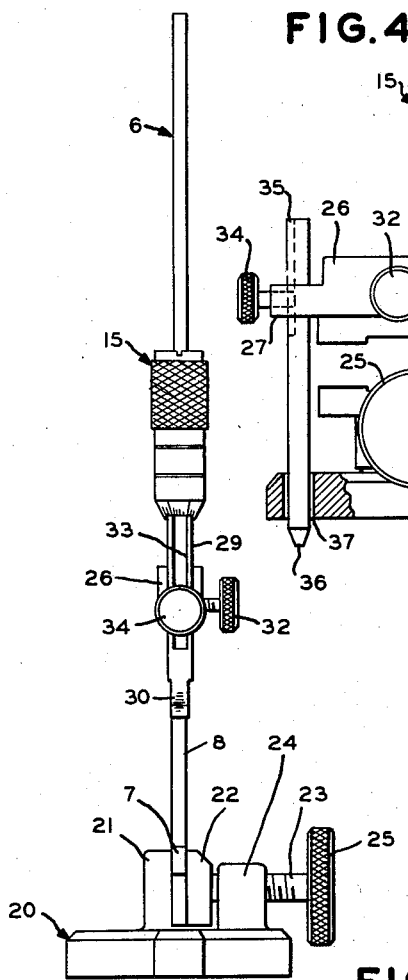
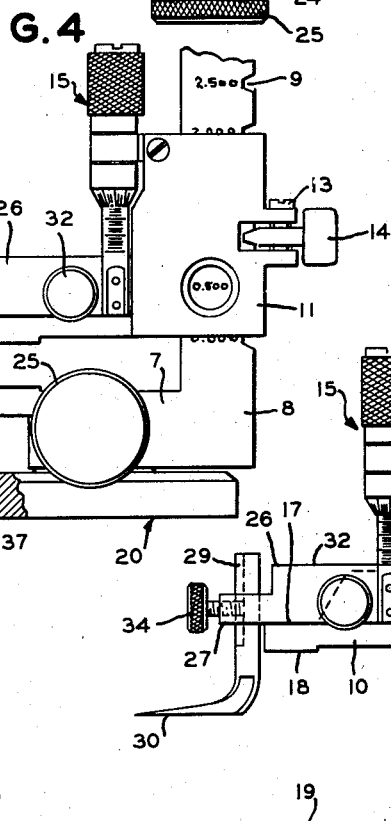
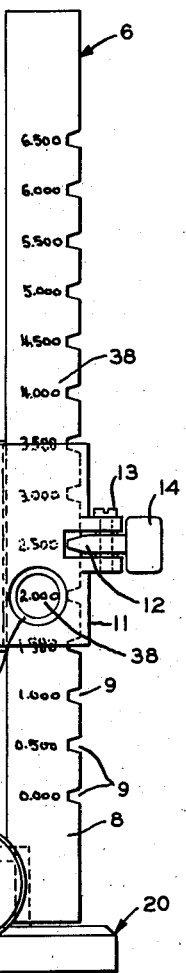
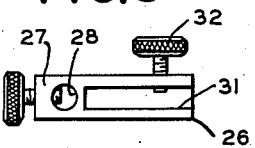
*INVENTOR.*
ALEXANDER ZWIERZYNSKI
BY
ATTORNEY United States Patent Office 2,844,878
Patented July 29, 1958

2,844,878
COMBINED MICROMETER INSTRUMENT

Alexander Zwierzynski, New York, N. Y.

Application February 15, 1956, Serial No. 565,592

1 Claim. (Cl. 33—170)

This invention relates to combination mensuration and gaging instruments capable of wide use, and particularly to a combined micrometer instrument.

The main object of my invention is to provide a special measuring instrument which is capable of being used to measure various kinds of dimensions on parts and machines, etc.

Another object of this invention is to have a micrometer instrument that is capable of measuring height, hole or cavity depth, inside and outside dimensions and the like, and be generally useful to machinists and mechanics and inspectors.

A further object is to have such a combination instrument which is virtually a group of measuring instruments in one so as to save space and contribute to convenience in the shop.

It is also an important object to have such a combined measuring instrument which is reasonably light and portable.

It is likewise an object of my invention to have such a combination instrument for measuring accurately various kinds of dimensions as outlined which is relatively simple and easy to use and also reasonable in cost, as well as sturdy in construction and adjustable to boot, in order to encourage wide sale and distribution on the market.

Other objects and advantages of my invention will appear in greater detail as the specification proceeds.

In order to facilitate ready comprehension of this invention for a proper appreciation of the salient features thereof, the invention is illustrated on the accompanying drawing forming part hereof, and in which:

Figure 1 is a front elevation of a combined micrometer instrument made according to my invention and embodying the same in a practical form;

Figure 2 is a side elevation of the same instrument as seen from the right in Figure 1;

Figure 3 is a top plan view of the same instrument as seen from above in Figure 2;

Figure 4 is a fragmentary side elevation similar to that of Figure 2, but showing the instrument adjusted for depth measuring in contrast with height measuring of said Figure 2; and Figure 5 is a bottom plan view of a detail part of the instrument of the foregoing figures to illustrate its slot.

Throughout the views, the same reference numerals indicate the same or like parts and features.

In machine shops, plants and experimental laboratories, etc., frequent use is made of calipers, micrometers, depth gages and the like, each being a distinct instrument and requiring separate care and a separate casing or place in an instrument cabinet. This makes for loss of time and inconvenience because each instrument must be separately looked up and handled and must be handled differently, not to mention that greater cost is involved when buying the instruments in the first place.

Upon considering this problem, it has occurred to me that several suitable measuring instruments can well be combined in an efficient and effective manner to form one overall combination that is handled as a single omnibus instrument and restored to its cabinet as such when no longer to be used. As a result of such consideration, I have succeeded in producing a combined micrometer instrument as already indicated which will now be described in detail in the following, due reference being again had to the drawing.

Hence, in the practice of my invention, a micrometer caliper generally indicated at 6 includes a main jaw 7 rigid with an externally serrated bar 8 with spaced rear serrations or V-shaped cuts 9, 9, etc., while a movable jaw 10 has a hollow box portion 11 slidable upon the bar 8. At the rear of the box 11 is pivotally mounted a manually operated locking cam 12 pivoting on screw or pin 13, while the finger piece 14 is accessible for swinging cam 12 into engagement with any one of V-shaped cuts 9 at will when the movable jaw has been slid to desired position. The movable jaw 10 is adjustable upon its box 11 by means of a micrometer adjustment generally indicated at 15, so that the cam 12 is used for rough positioning of the jaw 10 and the micrometer device 15 serves for fine adjustment. The jaws 7 and 10 have outside contact surfaces 16 and 17 for measuring between two spaced sides of a cavity or hole, and inside surfaces 18 and 19 for measuring outside dimensions such as thickness of parts. Micrometer calipers of the straight type are, of course known, and hence, the micrometer caliper thus far described need not be detailed further as its principles of operation resemble those already known, and it serves for inside and outside measuring of various objects and holes, spaces and cavities therein.

This micrometer device may have its use broadened so as to be capable of use as a height gage, both inside and outside, as will now be noted. A clamping base or foot, generally indicated at 20 has a fixed upwardly projecting jaw 21 and a movable jaw 22 as well as a threaded post with an adjusting screw 23 extending through this post 24 for forcing jaw 22 toward fixed jaw 21. When the caliper 6 is set upright with main jaw 7 between jaws 21 and 22 of base 20 and jaw 7 resting directly in contact with the base as such, the knob 25 of screw 23 may be turned to tighten this screw against the side of the jaw 7, so that the instrument thus assembled appears as shown in Figure 2, with movable jaw 10 located above main jaw 7.

Upon the upper movable jaw 10 is mounted a slotted saddle 26 provided with a forward extension 27 with a vertical hole 28 therein for receiving a feeler 29 having the feeler point 30 for making contact upon a member whose height is to be ascertained. From the underside of this saddle a slot 31 extends upwardly to allow the saddle to straddle the upper part of jaw 10, while a set screw 32 serves to fix the saddle in place on this jaw. When the feeler 29 is released and inverted so that the point surface 30 faces upwards, the inside height of an object or part from the surface upon which the instrument stands may be measured. The feeler itself preferably has a keyway 33 for receiving the inner end of an adjusting screw 34 by which to set or release the finger at will. Thus, the instrument in such setting serves to measure overall height as well as inside height to an under surface of part.

The instrument is also capable of measuring the depth of a hole, recess, shoulder or cavity, as illustrated in Figure 4. The finger 29 has been replaced by a straight contact rod 35 extending down through hole 28 in saddle extension 27 and terminating in the contact point 36. In order to accommodate this rod in proper manner, the base 20 has a vertical front clearance hole 37, while the caliper jaw and bar 7 and 8 are shifted rearwardly between base jaws 21 and 22 so that rod 35 may project freely down through the base into the cavity or recess or hole to be measured. In order to render the reading of the dimensions involved obvious, the movable jaw in its sliding box 11 has a side window 37 through which any one of the figures indicated at 38 along bar 8 may be seen as they register with this window, the micrometer 15 serving to adjust to absolute accuracy in each case. The instrument is thus capable of use for various kinds of dimensions as outlined, and takes the place of several measuring instruments, while being convenient, reliable and portable.

The contact rod and finger may be replaced by an indicator having a dial and feeler registering on the dial, so that the instrument also serves to operate with a dial indicator.

Manifestly, variations may be resorted to, and parts and features may be modified or used without others within the scope of the appended claim.

Having now fully described my invention, I claim:

An instrument for measuring height, cavity and hole depth as well as inside and outside dimensions comprising a caliper having a rigid fixed jaw provided with inside and outside measuring surfaces and having a bar with spaced rear external serrations and a movable jaw with inside and outside measuring surfaces, said jaw having a hollow box portion slidable upon said bar, sight means on said box over said bar, a locking cam pivotally mounted at the rear of said box, a finger piece for swinging said cam into engagement with any one of said serrations on said bar said jaw adjustable on said bar by means of a micrometer mounted on said box on the opposite side of said bar from said finger piece; a clamping base having upwardly extending adjustable clamping means securing said fixed jaw; a hole in said base; a slotted saddle mounted on said movable jaw; said saddle bearing adjustable feeler point means overlying said hole in said base.

References Cited in the file of this patent

UNITED STATES PATENTS

| | | |
|---|---|---|
| 2,252,146 | Walsh | Aug. 12, 1941 |
| 2,454,327 | Malsom | Nov. 23, 1948 |
| 2,617,199 | Samotey | Nov. 11, 1952 |

FOREIGN PATENTS

| | | |
|---|---|---|
| 116,280 | Sweden | Apr. 23, 1946 |
| 248,519 | Switzerland | Feb. 2, 1948 |